Aug. 24, 1948.  P. M. KAUMANS  2,447,580
DEVICE FOR TESTING ELECTRIC IRONS
Filed July 19, 1946
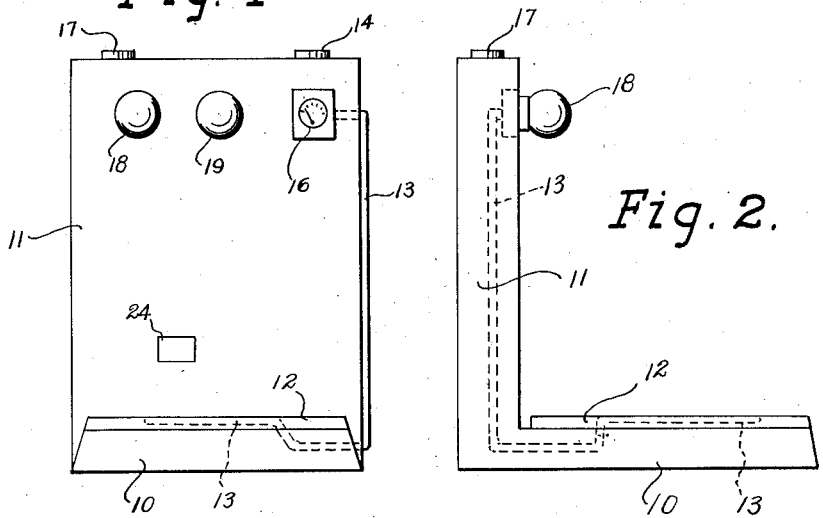
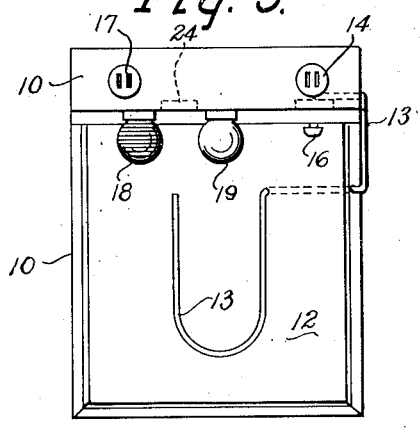
PAUL M. KAUMANS
*INVENTOR.*
BY
*ATTORNEYS.*

Patented Aug. 24, 1948

2,447,580

UNITED STATES PATENT OFFICE 2,447,580

DEVICE FOR TESTING ELECTRIC IRONS

Paul M. Kaumans, Topeka, Kans.

Application July 19, 1946, Serial No. 684,798

3 Claims. (Cl. 73—1)

The present invention relates to devices for testing electric irons and is more particularly concerned with a device to test and check electric irons and the thermostats thereof.

The primary object of the invention is to provide a device of the character referred to which will readily determine and indicate automatically whether the thermostat of the electric iron is cutting off and on at the correct temperature of the sole plate; also whether there is continuity of current and the thermostat is working.

Another object of the invention is to provide a device of the character referred to which will set the thermostat of the electric iron accurately, in accordance with factory specifications, if it be found that the thermostat fails to cut off and on at the correct sole plate temperature.

A further object of the invention is to provide a device of the character referred to of simpler and more compact construction than prior devices.

With the foregoing and other objects and advantages in view the invention consists of the novel construction and arrangement of parts hereinafter described and claimed.

In the accompanying drawings illustrating the invention,

Figure 1 is a front elevation of the device.

Figure 2 is a side elevation thereof.

Figure 3 is a top plan view and

Figure 4 is a diagrammatic view illustrating the relative positions of the components of the instrument and circuit wiring.

Like numerals, as used in the description and drawings, designate the same parts of construction.

In conventional types of electric irons, thermally-sensitive means are installed to control the temperature of the sole plate and they are usually adjusted to cut off current when the temperature reaches a predetermined maximum. Most frequently the factory specifications state the maximum temperature.

Frequently an electric iron will not function properly, hence a test is desirable to determine whether the thermostat is functioning or there is a continuity of current.

The hereinafter device will readily determine and indicate the condition of both.

10 is the base of the device and 11 the perpendicular back which are joined by angle irons. The base and back are oblong in shape. A thin fire-proof plate 12, substantially the size of the upper part of the base is superimposed. The base and back are constructed preferably of steel.

A U-shaped tube 13, positioned horizontally and set in a conforming aperture in the plate 12 and flush with the top surface of the plate. The tube contains a fluid susceptible to contraction and expansion under heat. On top of instrument back 11 is an ordinary receptacle or socket 14, where the cord of the electric iron can be plugged in for a test. The extended arm of tube 13 is connected to the bellows of an adjustable thermostat 15.

A thermostat dial 16, with indicator and knob, is provided on the face of back 11, wherewith to set the thermostat at heat temperature suitable to the sole of the iron to be tested.

On the top of the back 11 and suitably spaced from receptacle or socket 14, is a second receptacle 17 for the plug in a power line, preferably 110 volts A. C.

On the face of the instrument back and preferably in horizontal alignment with the thermostat dial, are two spaced pilot lamps 18 and 19, preferably of 7½ watts.

These two lamps are connected in a circuit 20 running from one contact point of the thermostat to a contact point 21 in proximity to a contact point 22 on the arm 23 of an armature.

The coil 24 of a relay of 3 to 5 amperes, is positioned contiguous to the arm of said armature. The relay coil is in circuit with the load line 25 from plug receptacle 14, while the armature arm is connected to the current line 26 from plug receptacle 17.

The pilot lamps are connected in circuit with both of said plug receptacles, as at 27, and the remaining contact point of the thermostat is connected to the current line 26, as at 28.

The operation of the aforesaid instrument in testing an electric iron is as follows:

The iron is placed on the fireproof plate 12 of the instrument. The sole plate of the iron will be in contact with the heat sensitive tube 13. The service cord on the iron is plugged in the receptacle 14 and the indicator on the thermostat set on the degree of temperature for heating the sole-plate, this being determined by the maximum fixed for same by factory specifications. At the same time the thermostat of the iron is set to correspond therewith.

Then a live current is plugged in at receptacle 17. Immediately the pilot lamp 18 should light, if there is current flowing through the iron. If it fails to light it indicates that the circuit in the iron is open. By referring to the plan of wiring shown in Figure 4, it will be observed that the circuit in the iron, if in order and closed, will energize relay coil 24 and attract the armature arm 23 by magnetism, thus closing contacts 21 and 22 and completing the circuit to pilot lamp 18.

If the circuit in the iron is functioning the thermostat in the iron is set on one of its heat positions and allowed to heat up. If said thermostat is working, the pilot lamp 18 will go out when the iron heats up to the temperature at which the thermostat was set, because it would open the circuit in the iron.

By allowing the iron to cycle a couple of times it will demonstrate that the thermostat of the iron is working but it will not be known whether the actual temperature of the sole plate or ironing surface corresponds to the setting of the thermostat of the iron, therefore as the iron is heating, the sole plate is contacting the surface of tube 13 and activating the fluid therein to operate the bellows of the thermostat in the instrument and thereby close the circuit to pilot lamp 19.

If the dial on the iron's thermostat be set to the desirable high of temperature and the dial on the instrument's thermostat is set to correspond, the pilot lamp 18 will turn off automatically when the correct temperature is reached, provided the iron's thermostat is in working order. At approximately the same time the actual temperature of the sole plate of the iron will cut off the pilot lamp 19. If both lamps go on and off at approximately the same time, it will indicate that the iron's temperature is all right and working properly.

As different embodiments may be made of this inventive concept and modifications may be made in the embodiment hereinbefore shown and described, it will be understood that the matter herein is to be interpreted as illustrative merely, and not in a limiting sense.

What I claim is:

1. A device for testing electric irons, comprising a base support including a top member of fireproof material, an instrument board mounted upon the base support, an instrument circuit mounted upon the board, a tube having a part carried by the top member and arranged to contact with the sole of the electric iron and containing an expansible fluid, means to connect the instrument circuit with a source of electric current, means to connect the circuit of an electric iron with the instrument circuit, the instrument circuit and electric circuit being connected in series, a visible pilot lamp connected in the instrument circuit for obtaining current therefrom, means connected in the instrument circuit to close the pilot lamp circuit when the electric iron circuit is closed, a second visible pilot lamp connected in the instrument circuit to receive current therefrom, a switch operated by the fluid in the tube when the fluid expands and connected with the second pilot lamp to cause such second pilot lamp to glow when the sole of the iron is heated to a selected maximum temperature, and adjustable means on the instrument board to set the switch to close at the maximum degree of heat desirable for the sole of the iron.

2. A device for testing electric irons, comprising a base support, an instrument board mounted upon the base support, an instrument circuit mounted upon the board, a tube having a part carried by the base support and arranged to contact with the sole of the electric iron and containing an expansible fluid, means to connect the instrument circuit with a source of electric current, means to connect the instrument circuit with the circuit of the electric iron, the instrument circuit and electric iron circuit being connected in series, a visible pilot light connected in the instrument circuit for obtaining current therefrom, means connected in the instrument circuit to cause the current to pass through the pilot lamp when the electric iron circuit is closed, a second visible pilot lamp connected in the instrument circuit to receive current therefrom, a switch operated by the fluid in the tube when the fluid expands and connected with the second lamp to cause such second lamp to glow when the sole of the iron is heated to a selected maximum temperature, and adjustable means on the instrument board to set the switch to close at a selected heat degree, said switch including a scale and a pointer for indicating the degree at which the switch is set to close.

3. A device for testing electric irons, comprising a base, an instrument board mounted upon the base, an instrument circuit mounted upon the board, a tube having a part carried by the base and arranged to contact with the sole of the electric iron and containing an expansible fluid, means to connect the instrument circuit with a source of electric current, means to connect the instrument circuit with the circuit of an electric iron, the instrument circuit and electric iron circuit being connected in series, a visible pilot light connected in the instrument circuit for obtaining current therefrom, a relay connected in the instrument circuit and adapted to be closed when the electric iron circuit is closed and to cause current to pass through the pilot lamp when such relay is closed, a second visible pilot lamp connected in the instrument circuit to receive current therefrom, a switch mounted upon the instrument board and closed when the fluid expands within the tube and connected with the second lamp to cause such second lamp to glow when the sole of the iron is heated to a selected temperature, and adjustable means on the instrument board to set the switch to close at a selected heat degree.

PAUL M. KAUMANS.

REFERENCES CITED

The following references are of record in the file of this patent:

UNITED STATES PATENTS

| Number | Name | Date |
|---|---|---|
| Re. 17,453 | Klahn et al. | Oct. 8, 1929 |
| 1,781,287 | Mayo | Nov. 11, 1930 |
| 2,325,377 | Dickie | July 27, 1943 |

FOREIGN PATENTS

| Number | Country | Date |
|---|---|---|
| 521,500 | Great Britain | May 23, 1940 |